US009087185B2

(12) United States Patent
Arashin et al.

(10) Patent No.: US 9,087,185 B2
(45) Date of Patent: Jul. 21, 2015

(54) SERVER DEVICE FOR TRANSMITTING AND RECEIVING DATA TO AND FROM CLIENT DEVICE THROUGH ACCESS POINT

(75) Inventors: Nobuhiko Arashin, Osaka (JP); Osamu Tanaka, Osaka (JP); Toyoshi Yamada, Osaka (JP); Masahiko Nagoshi, Osaka (JP); Akihiko Shiotsuki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 379 days.

(21) Appl. No.: 13/605,232

(22) Filed: Sep. 6, 2012

(65) Prior Publication Data

US 2012/0331165 A1 Dec. 27, 2012

Related U.S. Application Data

(63) Continuation of application No. PCT/JP2011/001353, filed on Mar. 8, 2011.

(30) Foreign Application Priority Data

Mar. 8, 2010 (JP) ................................ 2010-050263

(51) Int. Cl.
*G06F 15/16* (2006.01)
*G06F 21/33* (2013.01)
(Continued)

(52) U.S. Cl.
CPC .......... *G06F 21/335* (2013.01); *H04L 63/0884* (2013.01); *H04W 12/06* (2013.01);
(Continued)

(58) Field of Classification Search
USPC ................................................ 709/203, 229
See application file for complete search history.

(56) References Cited

U.S. PATENT DOCUMENTS

2002/0178365 A1 11/2002 Yamaguchi
2004/0139201 A1* 7/2004 Chaudhary et al. ........... 709/229
(Continued)

FOREIGN PATENT DOCUMENTS

JP 2002-359631 12/2002
JP 2003-318939 11/2003
(Continued)

OTHER PUBLICATIONS

International Search Report issued Apr. 12, 2011 in corresponding International (PCT) Application No. PCT/JP2011/001353.
(Continued)

*Primary Examiner* — Philip B Tran
(74) *Attorney, Agent, or Firm* — Wenderoth, Lind & Ponack L.L.P.

(57) ABSTRACT

A server device for transmitting and receiving data to and from a client device over a wireless communication network including an access point, the server device comprising: wireless connection determining means for determining whether or not the client device is wirelessly communicatively connected over the wireless communication network; security determining means for determining whether or not the client device is securely connected to the access point; and permitting means for permitting an automatic connection of the client device to the server device, when the wireless connection determining means determines that the client device is wirelessly communicatively connected, and when the security determining means determines that the client device is securely connected to the access point.

16 Claims, 17 Drawing Sheets

(51) Int. Cl.
*H04L 29/06* (2006.01)
*H04W 12/06* (2009.01)
*H04W 84/12* (2009.01)

(52) U.S. Cl.
CPC ...... *H04W 84/12* (2013.01); *G06F 2221/2107* (2013.01); *G06F 2221/2115* (2013.01); *G06F 2221/2119* (2013.01); *G06F 2221/2129* (2013.01); *G06F 2221/2141* (2013.01)

(56) References Cited

U.S. PATENT DOCUMENTS

| | | | | |
|---|---|---|---|---|
| 2007/0184837 | A1 | 8/2007 | Hohl et al. | |
| 2007/0192596 | A1 | 8/2007 | Otsuka | |
| 2008/0186882 | A1* | 8/2008 | Scherzer et al. | 370/310 |
| 2008/0250151 | A1 | 10/2008 | Tomita | |
| 2009/0046861 | A1* | 2/2009 | Krishnaswamy | 380/270 |
| 2011/0167263 | A1* | 7/2011 | Cross et al. | 370/328 |

FOREIGN PATENT DOCUMENTS

| | | |
|---|---|---|
| JP | 2006-100957 | 4/2006 |
| JP | 2006-279848 | 10/2006 |
| JP | 2006-285090 | 10/2006 |
| JP | 2007-523551 | 8/2007 |
| JP | 2008-165333 | 7/2008 |
| WO | 2005/079036 | 8/2005 |

OTHER PUBLICATIONS

International Preliminary Report on Patentability issued Oct. 11, 2012 in International (PCT) Application No. PCT/JP2011/001353.

* cited by examiner

*Fig.5*

DEVICE DESCRIPTION OF CLIENT DEVICE

```
<?xml version="1.0"?>
<root xmlns="urn:schemas-upnp-org:device-1-0">
  <specVersion>
    <major>1</major>
    <minor>0</minor>
  </specVersion>
  <URLBase>http://....**:port</URLBase>
  <device>
    <deviceType>urn:****-com:device:X_WLANDevice:1</deviceType>
    <friendlyName>Wireless LAN Support Device</friendlyName>
    <manufacturer>**** Co., Ltd.</manufacturer>
    <manufacturerURL>http://****.co.jp</manufacturerURL>
    <modelDescription>XXXXXXXXXXXXXXX</modelDescription>
    <modelName>XXXXX</modelName>
    <modelNumber>YYYY</modelNumber>
    <modelURL>http://****.co.jp/castelha</modelURL>
    <serialNumber>XXXXXX</serialNumber>
    <UDN>uuid:****</UDN>
    <serviceList>
      <service>
        <serviceType>urn:schemas-****-com:service:X_WLANConfiguration:1</serviceType>
        <serviceId>urn:****-com:serviceId:X_WLANConfigService:1</serviceId>
        <SCPDURL>/xxx.xml</SCPDURL>
        <controlURL>/xxx.cgi</controlURL>
        <eventSubURL></eventSubURL>
      </service>
    </serviceList>
  </device>
</root>
```

*Fig.6*

SERVICE DESCRIPTION OF CLIENT DEVICE

```
<?xml version="1.0" ?>
<scpd xmlns="urn:schemas-upnp-org:service-1-0">
  <specVersion>
    <major>1</major>
    <minor>0</minor>
  </specVersion>
  <actionList>
    <action>
      <name>GetAuthEncStatus</name>
      <argumentList>
          <argument>
        <name>NewMac</name>
        <direction>out</direction>
        <relatedStateVariable>MACAddr</relatedStateVariable>
      </argument>
      <argument>
        <name>NewSSID</name>
        <direction>out</direction>
        <relatedStateVariable>SSID</relatedStateVariable>
      </argument>
      <argument>
        <name>NewBSSID</name>
        <direction>out</direction>
        <relatedStateVariable>BSSID</relatedStateVariable>
      </argument>
      <argument>
        <name>NewEncModes</name>
        <direction>out</direction>
        <relatedStateVariable>EncModes</relatedStateVariable>
      </argument>
      <argument>
        <name>NewAuthModes</name>
        <direction>out</direction>
        <relatedStateVariable>AuthModes</relatedStateVariable>
      </argument>
      </argumentList>
    </action>
  </actionList>
  <serviceStateTable>
    <stateVariable sendEvents="no">
      <name>MACAddr</name>
      <dataType>string</dataType>
    </stateVariable>
    <stateVariable sendEvents="no">
      <name>SSID</name>
      <dataType>string</dataType>
    </stateVariable>
    <stateVariable sendEvents="no">
      <name>BSSID</name>
      <dataType>string</dataType>
    </stateVariable>
    <stateVariable sendEvents="no">
      <name>EncModes</name>
      <dataType>string</dataType>
      <allowedValueList>
        <allowedValue>NONE</allowedValue>
        <allowedValue>WEP</allowedValue>
        <allowedValue>TKIP</allowedValue>
        <allowedValue>AES</allowedValue>
      </allowedValueList>
    </stateVariable>
    <stateVariable sendEvents="no">
      <name>AuthModes</name>
      <dataType>string</dataType>
      <allowedValueList>
        <allowedValue>OPEN</allowedValue>
        <allowedValue>SHARED</allowedValue>
        <allowedValue>WPA-PSK</allowedValue>
        <allowedValue>WPA2-PSK</allowedValue>
      </allowedValueList>
    </stateVariable>
  </serviceStateTable>
</scpd>
``` d1 d2 d3 d4 d5 d6 d11

Fig.8

| INTERFACE | ENCRYPTION (1: ENABLED; 0: DISABLED) | CLIENT DEVICE IDENTIFIER |
|---|---|---|
| WLAN | 1 | CLIENT DEVICE A |
| LAN | N/A | CLIENT DEVICE B |
| WLAN | 0 | CLIENT DEVICE C |

*Fig.10*

| OBTAINED FROM COMMUNICATION PACKET | CHECKED BY MAC HEADER | OBTAINED BY UPnP |
|---|---|---|
| ORIGINATING MAC ADDRESS | ENCRYPTION (1: ENABLED; 0: DISABLED) | CLIENT DEVICE IDENTIFIER |
| Client-A | 1 | CLIENT DEVICE A |
| AP | 1 | CLIENT DEVICE B |
| Client-C | 0 | CLIENT DEVICE C |

*Fig. 13*

DEVICE DESCRIPTION OF SERVER DEVICE

```
<?xml version="1.0"?>
<root xmlns="urn:schemas-upnp-org:device-1-0">
   <specVersion>
      <major>1</major>
      <minor>0</minor>
   </specVersion>
   <URLBase>http://....**:pp</URLBase>
   <device>
      <deviceType>urn:****-com:device:X_WLANControlDevice:1</deviceType>
      <friendlyName>Wireless LAN Support Device</friendlyName>
      <manufacturer>**** Co., Ltd.</manufacturer>
      <manufacturerURL>http://****.co.jp</manufacturerURL>
      <modelDescription>XXXXXXXXXXXXXXX</modelDescription>
      <modelName>XXXXX</modelName>
      <modelNumber>YYYY</modelNumber>
      <modelURL>http://****.co.jp/castelha</modelURL>
      <serialNumber>XXXXXX</serialNumber>
      <UDN>uuid:****</UDN>
      <serviceList>
         <service>
            <serviceType>urn:schemas-****-com:service:X_WLANStatus:1</serviceType>
            <serviceId>urn:****-com:serviceId:X_WLANStatusService:1</serviceId>
            <SCPDURL>/xxx.xml</SCPDURL>
            <controlURL>/xxx.cgi</controlURL>
            <eventSubURL></eventSubURL>
         </service>
      </serviceList>
   </device>
</root>
```

*Fig.14*

SERVICE DESCRIPTION OF SERVER DEVICE d20 d21

```xml
<?xml version="1.0" ?>
<scpd xmlns="urn:schemas-upnp-org:service-1-0">
  <specVersion>
    <major>1</major>
    <minor>0</minor>
   </specVersion>
  <actionList>
    <action>
      <name>SetAuthEncStatus</name>
      <argumentList>
        <argument>
          <name>NewMAC</name>
          <direction>in</direction>
          <relatedStateVariable>MACAddr</relatedStateVariable>
        </argument>
        <argument>
          <name>NewSSID</name>
          <direction>in</direction>
          <relatedStateVariable>SSID</relatedStateVariable>
        </argument>
        <argument>
          <name>NewBSSID</name>
          <direction>in</direction>
          <relatedStateVariable>BSSID</relatedStateVariable>
        </argument>
        <argument>
          <name>NewEncModes</name>
          <direction>in</direction>
          <relatedStateVariable>EncModes</relatedStateVariable>
        </argument>
        <argument>
          <name>NewAuthModes</name>
          <direction>in</direction>
          <relatedStateVariable>AuthModes</relatedStateVariable>
        </argument>
      </argumentList>
    </action>
  </actionList>
  <serviceStateTable>
    <stateVariable sendEvents="no">
      <name>MACAddr</name>
      <dataType>string</dataType>
    </stateVariable>
    <stateVariable sendEvents="no">
      <name>SSID</name>
      <dataType>string</dataType>
    </stateVariable>
    <stateVariable sendEvents="no">
      <name>BSSID</name>
      <dataType>string</dataType>
    </stateVariable>
    <stateVariable sendEvents="no">
      <name>EncModes</name>
      <dataType>string</dataType>
      <allowedValueList>
        <allowedValue>NONE</allowedValue>
        <allowedValue>WEP</allowedValue>
        <allowedValue>TKIP</allowedValue>
        <allowedValue>AES</allowedValue>
      </allowedValueList>
    </stateVariable>
    <stateVariable sendEvents="no">
      <name>AuthModes</name>
      <dataType>string</dataType>
      <allowedValueList>
        <allowedValue>OPEN</allowedValue>
        <allowedValue>SHARED</allowedValue>
        <allowedValue>WPA-PSK</allowedValue>
        <allowedValue>WPA2-PSK</allowedValue>
      </allowedValueList>
    </stateVariable>
  </serviceStateTable>
</scpd>
```

SERVER DEVICE FOR TRANSMITTING AND RECEIVING DATA TO AND FROM CLIENT DEVICE THROUGH ACCESS POINT

CROSS-REFERENCE TO RELATED APPLICATIONS

This is a continuation application of International Application No. PCT/JP2011/001353, with an international filing date of Mar. 8, 2011, which claims priority of Japanese Patent Application No. 2010-050263 filed on Mar. 8, 2010, the content of which is incorporated herein by reference.

BACKGROUND

1. Technical Field

The technical field relates to a technique for connecting between a server device and a client device in a wireless communication network.

2. Description of Related Art

In recent years, as personal computers (PCs) and the Internet have been popularized, it has been possible to access server devices connected to the Internet, using a PC, to view and obtain various types of information at home, at work, or the like.

Moreover, digital appliances such as a television, a hard disk recorder, or the like have been appeared, having wireless communication means and capable of connecting to a network. It has been popularized to connect the television and the hard disk recorder each having such a wireless communication means to a home wireless communication network, and watch and listen to a content recorded on the hard disk recorder as a server device, at the television as a client device remote from the hard disk recorder.

However, in wireless communications, radio waves may be intercepted. This is undesirable when transmitting a content which strongly requires protection of personal information or copyright. Thus, it is important to assure security of a wireless communication connection between the client device and the server device, for preventing leakage and damage of communication information, and preventing leakage of security settings information, and the like.

Among techniques for assuring security when connecting a client device to a wireless communication network, for example, Patent Document 1 discloses a technique for a network system to use an identification and a communication encryption key. Moreover, Patent Document 2 discloses a technique for a wireless ad hoc network to evaluate a response to a registration request message, confirm that no other registration process is being performed, and then perform a registration process using a public key certificate.

However, the conventional techniques described above are troublesome for a user, e.g., since the user's extra operations for assuring security are needed every time the device is connected.

On the other hand, Patent Document 3 discloses a technique for automatic setting of security between an access point and a client device. Specifically, according to Patent Document 3, when the access point is accessed by the client device through a wireless communication, the access point measures radio field intensity, accepts the access if the intensity is equal to or more than a threshold value, determine an encryption key for the wireless communication, and send the encryption key to the client device, thus achieving the automatic setting of the security between the access point and the client device, and accordingly, improving usability.

CITATION LIST

Patent Document

PATENT DOCUMENT 1: Japanese Patent Laid-open Publication No. 2008-165333

PATENT DOCUMENT 2: Japanese Patent Laid-open Publication No. 2007-523551

PATENT DOCUMENT 3: Japanese Patent No. 4237124

SUMMARY

Technical Problem

According to the conventional techniques described above, in order to assure the security when connecting a device, extra processes are required, including: transmitting and receiving special messages, determining an encryption key and transmitting and receiving it, measuring an electric field intensity (distance), and the like. This makes configurations and functions of the server device and the client device complicated, and in addition, this degrades usability, e.g., because it is necessary to perform the processes for assuring the security whenever connecting a device.

Moreover, when connecting a device to a home wireless communication network, the connection is established through a repeater, i.e., so-called access point. In this case, there is a problem that even if the server device is performing a secure communication, the entire communication is not secure unless the security between the access point and the client device is assured.

One non-limiting and exemplary embodiment is to provide a communication device, and a connection method between communication devices, in order to achieve more secure communication in a wireless communication connection between a server device and a client device, without reducing usability.

Solution to Problem

According to a first aspect, there is provided a server device for transmitting and receiving data to and from a client device through an access point. The server device is provided with: a first determining unit configured to determine whether or not the client device is wirelessly connected to the access point; a second determining unit configured to determine whether or not the client device is securely connected to the access point; and a third determining unit configured to determine whether or not to allow a connection from the client device to the server device through the access point, based on results of determination of the first and second determining units.

According to this configuration, using the simple means, it is possible to permit the automatic connection of the client device to the server device, only for a secure wireless communication connection between the client device and the server device. That is, it is possible to easily achieve a secure communication in the wireless communication connection between the server device and the client device, without reducing usability.

According to a second aspect, there is provided a communication method for transmitting and receiving data between a client device and a server device through an access point. The communication method includes steps of: a first determining step for determining whether or not the client device is wirelessly connected to the access point; a second determining step for determining whether or not the client device is securely connected to the access point; and a third determining step for determining whether or not to allow a connection from the client device to the server device through the access point, based on results of determination of the first and second determining steps.

These general and specific aspects may be implemented using a system, a method, and a computer program, and any combination of systems, methods, and computer programs.

Advantageous Effects of Invention

For a secure wireless connection, the present disclosure notices particularly the security status between the client device and the access point, and permits the connection (access) of the client device to the server device only for a secure wireless communication connection between the client device and the access point. With this configuration, a more secure communication between the server device and the client device is achieved. Moreover, the present disclosure determines whether or not the client device is securely connected to the access point, and when the security between the client device and the access point has been confirmed, automatically connects the client device to the server device, thus improving usability.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 5 is a diagram showing an example of a device description of the client device according to Embodiment 1.

FIG. 6 is a diagram showing an example of a service description of the client device according to Embodiment 1.

FIG. 8 is a diagram showing a management table produced by the server device of Embodiment 1 based on UPnP.

FIG. 10 is a diagram showing another example of the management table produced based on an MAC header of wireless LAN data.

FIG. 13 is a diagram showing an example of a device description of the server device according to Embodiment 2.

FIG. 14 is a diagram showing an example of a service description of the server device according to Embodiment 2.

DETAILED DESCRIPTION

Embodiments will be described below with reference to the accompanying drawings.

A wireless communication network system described in each of the following embodiments notices particularly a security status between a client device and an access point in a wireless communication connection, and permits an automatic connection (access) of the client device to the server device only for a secure wireless communication connection between the client device and the access point. With this configuration, a more secure communication between the server device and the client device is achieved without reducing usability.

1. Embodiment 1

1.1 System Configuration

In a wireless communication network system according to the present embodiment (hereinafter, referred to as the "system"), the communication is performed in compliance with the specification of DLNA (Digital Living Network Alliance). DLNA defines a server (DMS: Digital Media Server) and a client (DMP: Digital Media Player) as devices in compliance with DLNA. When the DMS and the DMP are connected to a network access point, the DMP can search the DMS in the network, and view and obtain information stored in the DMS. A personal computer (PC), a server device, a DVD (Digital Versatile Disc) recorder, and the like are available as the DMS, and AV equipment, a notebook computer, PDA (Personal Digital Assistants), and the like are available as the DMP.

Moreover, the system compliant with the specification of DLNA uses Ethernet (registered trademark) or a wireless LAN (WLAN: Wireless Local Area Network) defined in IEEE802.11 as a transmission standard, uses TCP/IP as a communication protocol, uses HTTP (Hyper Text Transfer Protocol) as a protocol for transmitting and receiving contents, and uses UPnP (Universal Plug & Play) as an architecture for connecting devices.

Figure 1:
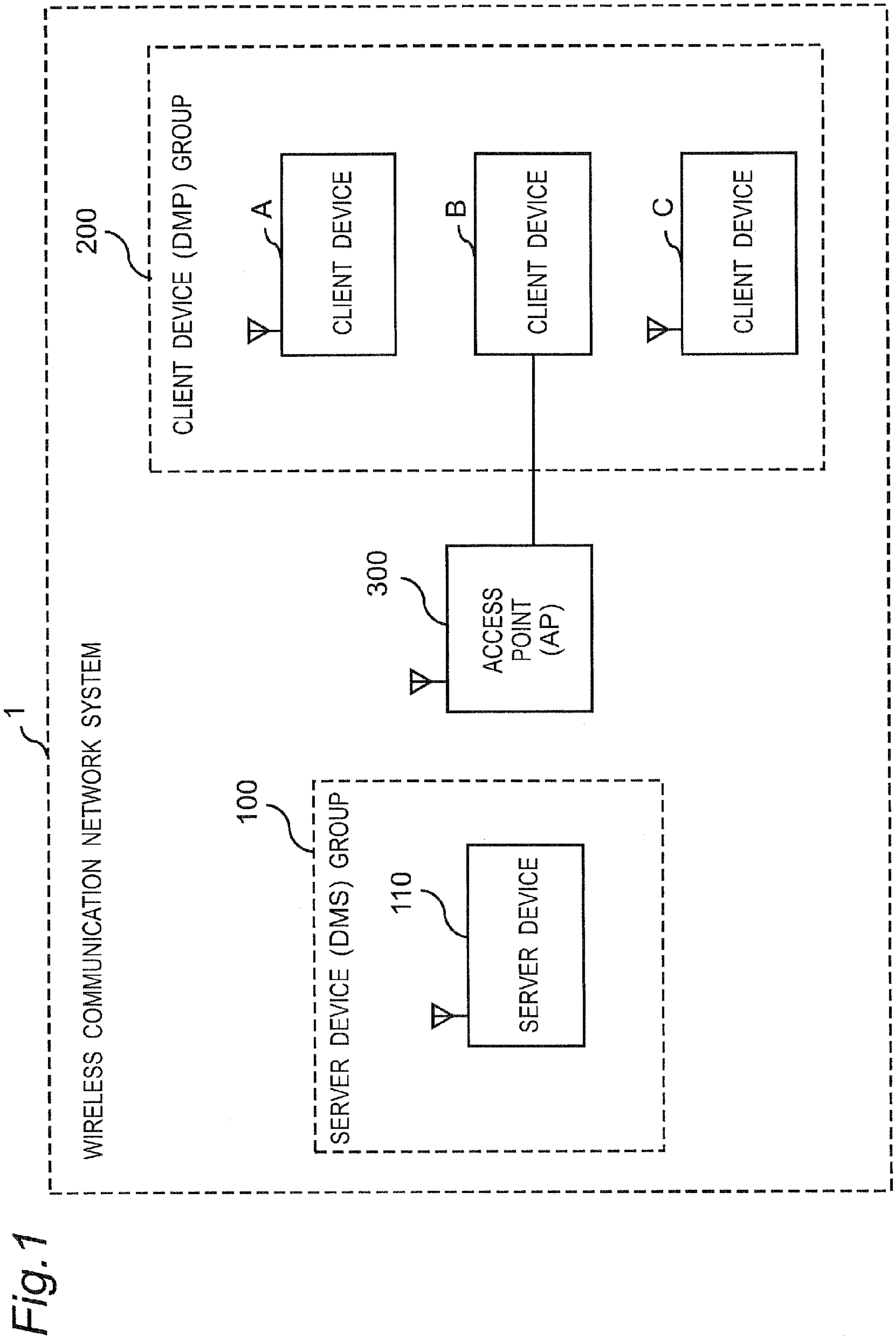
FIG. 1 is a configuration diagram of a wireless communication network system according to Embodiment 1.

FIG. 1 is a configuration diagram of a system according to Embodiment 1. As shown in FIG. 1, a system 1 includes, on the wireless LAN, a server device (DMS) group 100 as devices in compliance with DLNA, a client device (DMP) group 200 as devices in compliance with DLNA and connectable to the server device group, and an access point (AP) 300. In the present embodiment, the DMS group 100 includes one server device 110, and the DMP group 200 includes three client devices A, B, and C. The server device 110 is wirelessly connected to the access point 300. The client devices A and C are wirelessly connected to the access point 300, and the client device B is connected to the access point 300 by wire.

Each of the server device 110 and the client devices A, B, and C has hardware and software necessary for performing operations in accordance with guidelines of DLNA.

1.1.1 Configuration of Server Device

Figure 2:
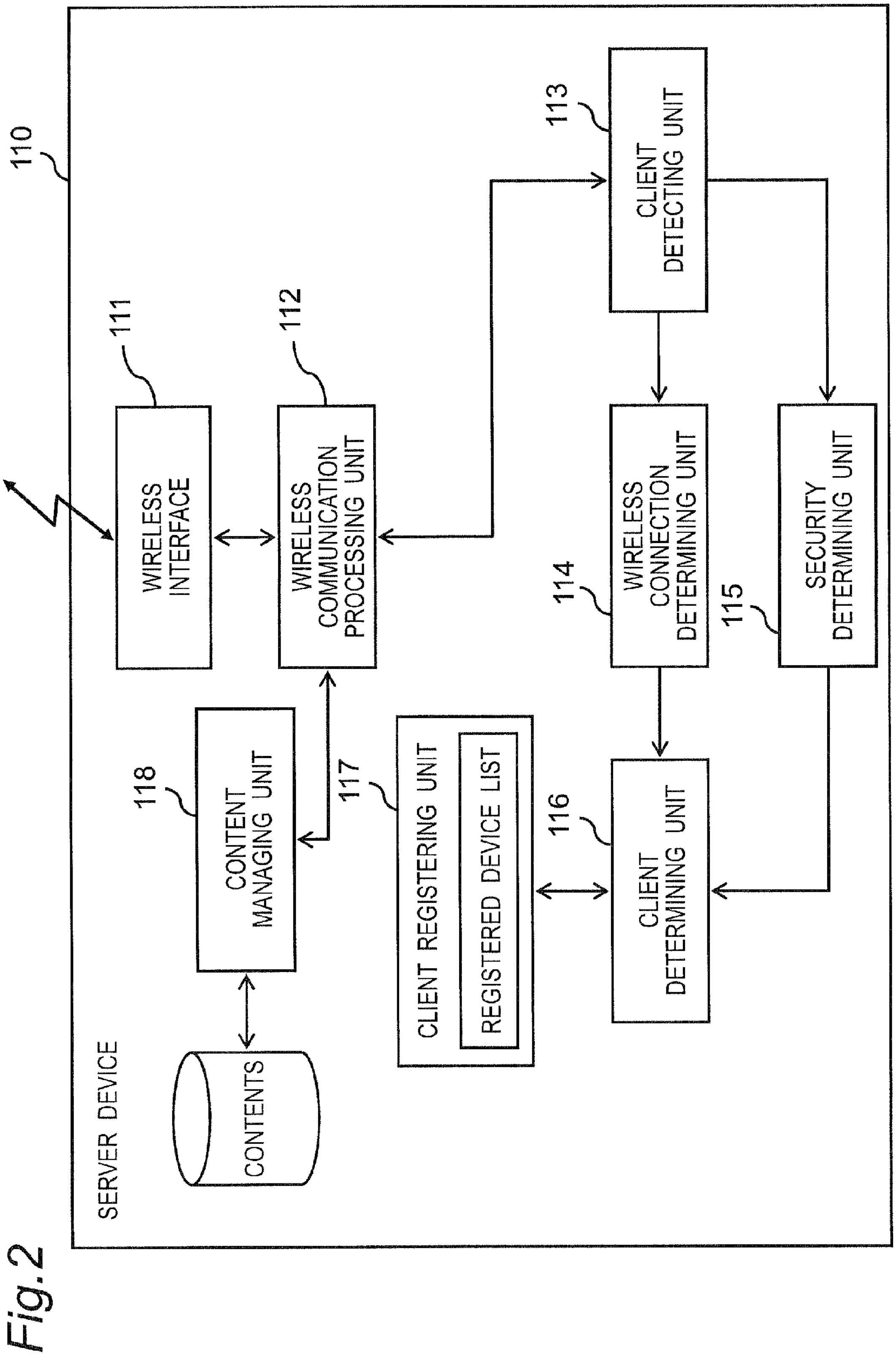
FIG. 2 is a configuration diagram of a server device according to Embodiment 1.

The server device 110 stores content data, and can provide the content data to the client devices A to C over a wireless communication network. FIG. 2 is a configuration diagram of the server device 110 according to Embodiment 1. The server device 110 is provided with a wireless interface 111, a wireless communication processing unit 112, a client detecting unit 113, a wireless connection determining unit 114, a security determining unit 115, a client determining unit 116, a client registering unit 117, and a content managing unit 118.

The wireless interface 111 is an input and output interface for transmitting and receiving wireless signals to and from external devices of the server device 110, and for example, a wireless LAN adapter connectable to a USB (Universal Serial Bus) port of the server device 110 is available for the wireless interface 111.

The wireless communication processing unit 112 performs predetermined signal processing of wireless signals received from the access point 300 through the wireless interface 111, and outputs the processed signals to the client detecting unit 113. Moreover, the wireless communication processing unit 112 performs predetermined signal processing of signals inputted from the client detecting unit 113, and outputs the processed signals to the wireless interface 111.

The client detecting unit 113 detects the client device connected over the network (e.g., the client devices A, B, C). Moreover, the client detecting unit 113 obtains information on a connection interface and security of the client device (e.g., the client devices A or C) from the signal inputted from the wireless communication processing unit 112, outputs the information on the connection interface to the wireless connection determining unit 114, and outputs the information on the security to the security determining unit 115. The client detecting unit 113 may use the UPnP protocol to detect the client device connected over the network.

The wireless connection determining unit 114 determines whether or not the wireless interface is used for the communication of the client device, based on the information inputted from the client detecting unit 113, and outputs the result of determination to the client determining unit 116.

The security determining unit 115 determines whether or not the client device is wirelessly and securely communicating with the access point 300, based on the information inputted from the client detecting unit 113, and outputs the result of determination to the client determining unit 116.

The client determining unit 116 determines whether or not to permit an automatic connection (access) of the client device to the server device, based on the information inputted from the wireless connection determining unit 114 and the security determining unit 115. As a result of the determination, if the automatic connection (access) of the client device is permitted, the client determining unit 116 sends, to the client registering unit 117, the information on the client device to be automatically connected. If the result of determination of the client determining unit 116 indicates that the automatic connection is not permitted, a connection request of the relevant client device may be rejected, or alternatively, a list of devices may be displayed on a display screen, the list including devices connectable to the server device 110 and currently not connected to the same, and including the information on the relevant client device, in order for the user to select on the display screen whether or not to permit the connection.

The client registering unit 117 automatically register the client devices based on the information inputted from the client determining unit 116. The client devices can be identified using, for example, an MAC address, or any other methods.

The content managing unit 118 controls playback of contents stored in the server device 110 and transmission of the contents to the client device.

1.1.2 Configuration of Client Device

Figure 3:
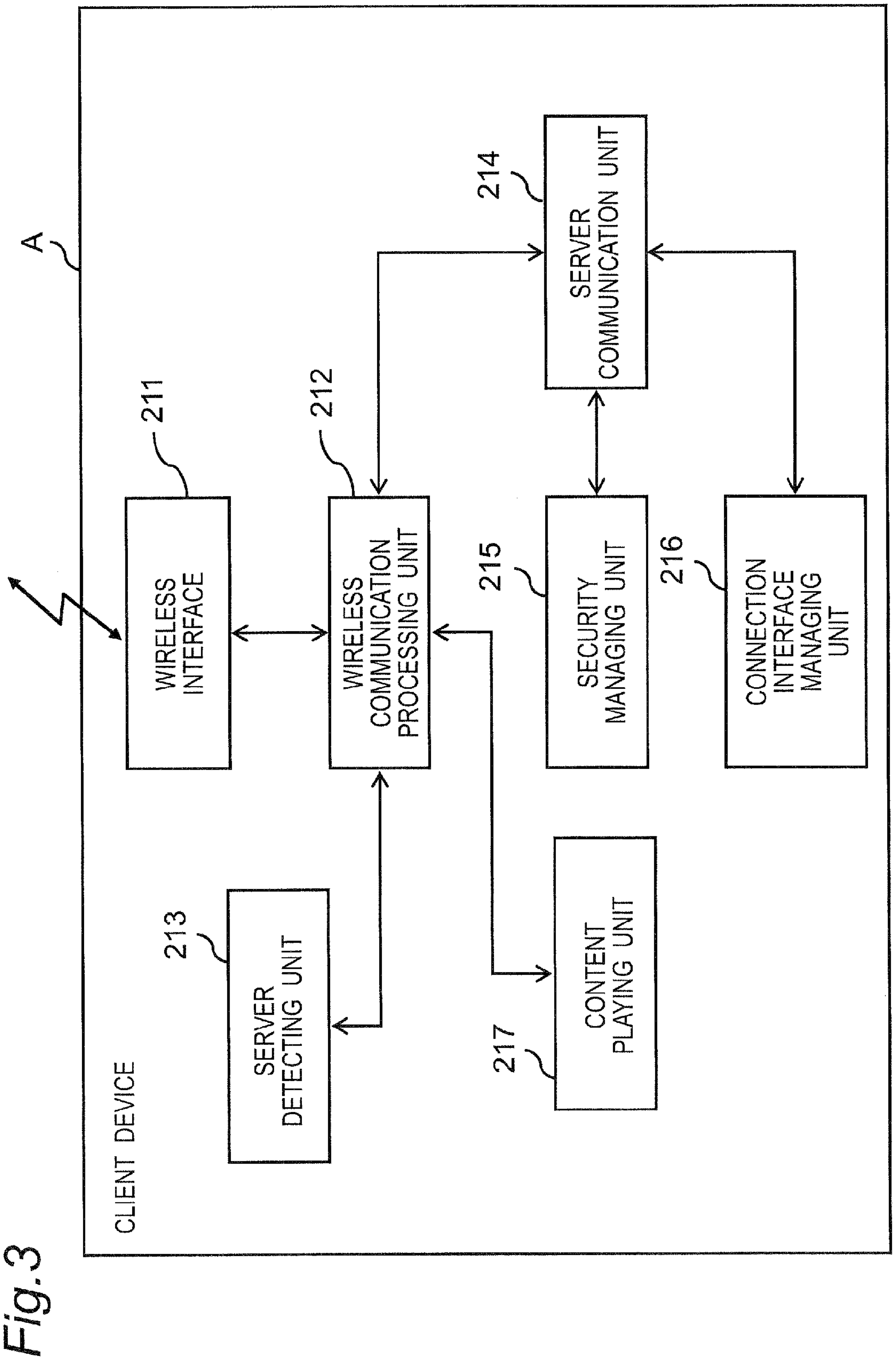
FIG. 3 is a configuration diagram of a client device according to Embodiment 1.

FIG. 3 is a configuration diagram of the client device A according to Embodiment 1. As shown in FIG. 3, the client device A is provided with a wireless interface 211, a wireless communication processing unit 212, a server detecting unit 213, a server communication unit 214, a security managing unit 215, a connection interface managing unit 216, and a content playing unit 217.

The wireless interface 211 and the wireless communication processing unit 212 have similar functions to those of the wireless interface 111 and the wireless communication processing unit 112 of the server device 110, and accordingly, their descriptions are omitted.

The server detecting unit 213 detects the server device connected over the network (e.g., the server device 110), and outputs information for accessing the detected server device, to the wireless communication processing unit 212.

The server communication unit 214 generates communication data for communicating with the sever device connected over the network through the wireless communication processing unit 212 and the wireless interface 211. At this time, the server communication unit 214 generates the communication data, based on information on the security of the device itself (the client device A) managed by the security managing unit 215 and information on the connection interface of the device itself managed by the connection interface managing unit 216.

The content playing unit 217 plays contents stored in the device itself or contents obtained from the server device.

Each of the client devices B, C is configured in a similar manner to that of the client device A.

1.2 Operation

The server device 110 and the client devices A to C according to the present embodiment are UPnP devices in compliance with the specification of UPnP, and the devices can be connected with each other using the UPnP functions. The UPnP device has descriptions describing functions and information that the device can provide. The descriptions include a device description describing services and the like that the device itself has, and a service description describing actions and the like that the respective services have. The device description and the service description are described in XML (eXtensible Markup Language). The server device 110 utilizes the descriptions of the client device to determine whether or not to permit the connection of the client device. Hereinafter, the descriptions of the client device A will be explained.

1.2.1 Descriptions of Client Device

Figure 4:
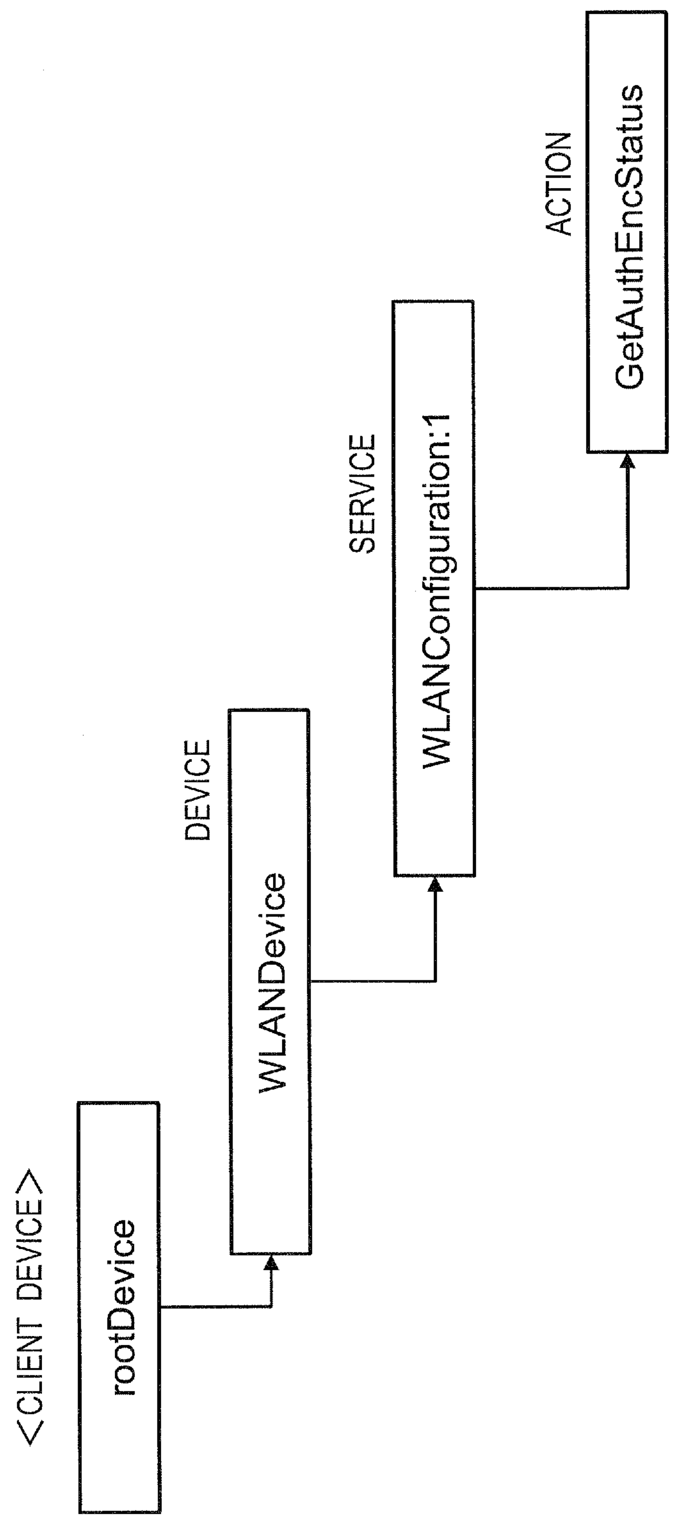
FIG. 4 is a diagram showing an example of UPnP architecture-based descriptions of the client device according to Embodiment 1.

FIG. 4 is a diagram explaining the descriptions of the client device A, which are defined in UPnP. The client device A has the wireless LAN communication function, and accordingly, has "WLANDevice". "WLANDevice" has a service, "WLANConfiguration: 1". "WLANConfiguration: 1" has an action, "GetAuthEncStatus".

FIG. 5 is a diagram showing an example of the device description of the client device A. FIG. 6 is a diagram showing an example of the service description of the client device A.

In the service description shown of FIG. 6, the new action, "GetAuthEncStatus" (sign "d1") is defined. As arguments of the action "GetAuthEncStatus", "NewMac" (sign "d2"), "NewSSID" (sign "d3"), "NewBSSID" (sign "d4"), "New EncModes" (sign "d5"), and "NewAuthModes" (sign "d6") are defined.

"NewMac" is an argument indicating a MAC address of the client device itself. "NewSSID" is an argument indicating an identifier for identifying an access point to which the client device is connected (e.g., the access point 300). "NewB- SSID" is an argument indicating an identifier corresponding to an MAC address of the access point to which the client device is connected. "NewEncModes" is an argument indicating an encryption method used in the communication between the client device and the access point. "NewAuthModes" is an argument indicating an authentication method used in the communication between the client device and the access point. In an example of FIG. 6, types of the respective arguments are set to "string" (see the sign "d11"). The above-described arguments are information on wireless connection settings of the client device, and hereinafter, these arguments are collectively referred to as "wireless connection information".

When the action "GetAuthEncStatus" is executed for the client device A having the above-described descriptions, the five arguments are set with the wireless connection information of the client device A, and these arguments are returned from the client device A.

1.2.2 Process of Obtaining Wireless Connection Information of Client Device by Server Device A process of obtaining the wireless connection information of the client device by the server device using the UPnP functions will be described.

A device (e.g., the server device 110 or the client device A) obtains and configures its own IP address using DHCP (Dynamic Host Configuration Protocol) or Auto-IP. The device can detect a target device (e.g., the client device A or the server device 110) using SSDP (Simple Service Discovery Protocol).

When a device is newly connected to the network, a message indicating "device description" and "service description" associated with the device is multicast over the network (i.e., a packet(s) of the message is transmitted without specifying a particular destination). By receiving this multicast message, the other devices can obtain information of the device newly connected to the network, such as its configuration, functions, specifications, and the like.

Then, the device can obtain detailed information of the target device, including the service description as service information, from URL (Uniform Resource Locator) of the device description contained in a response packet of the target device detected using SSDP.

Figure 7:
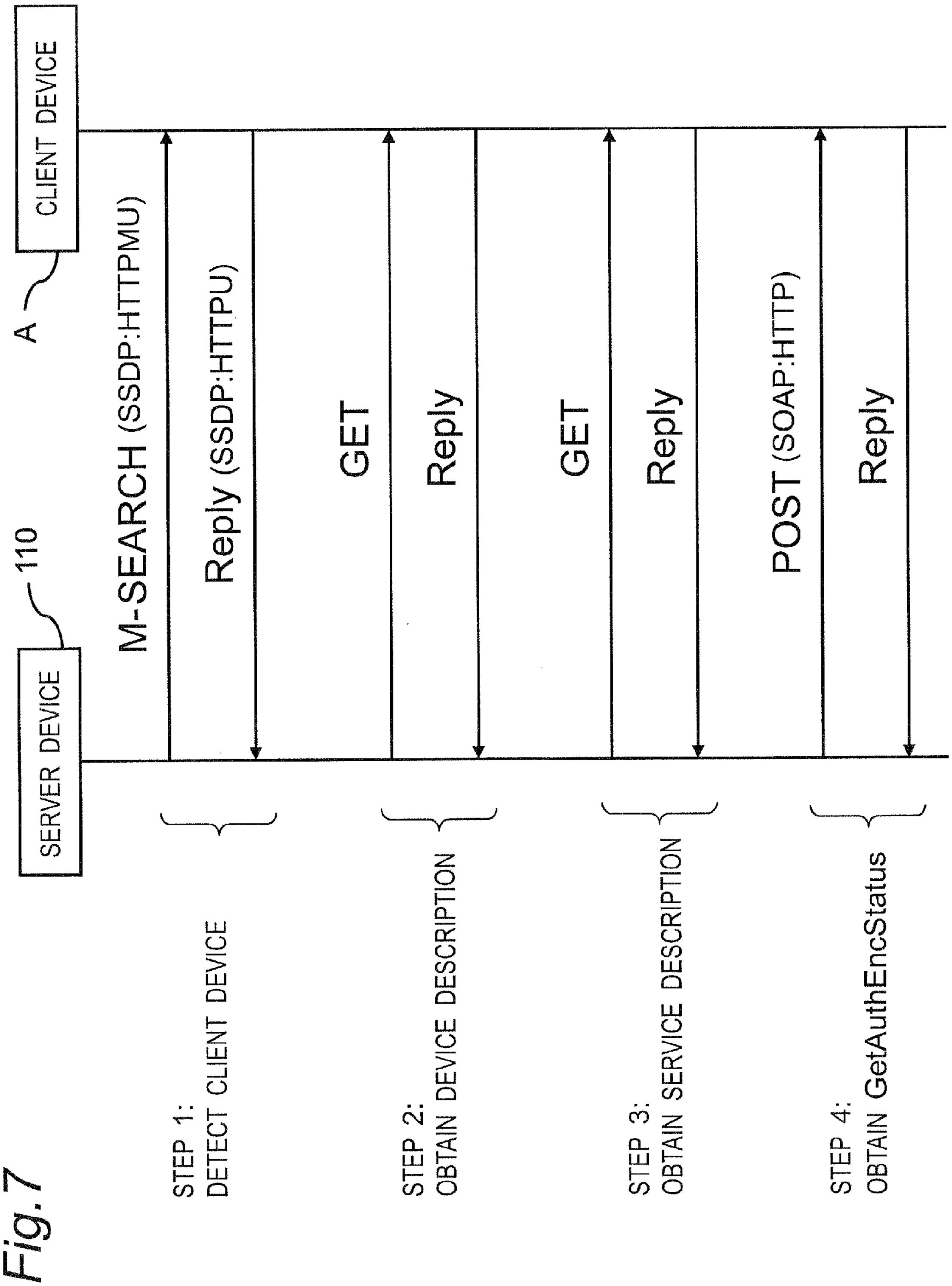
FIG. 7 is a diagram showing a communication process between the server device and the client device of Embodiment 1.

Referring to FIG. 7, a communication process between the server device and the client device according to the present embodiment based on the above-described process using the UPnP functions will be described in a specific manner. In the following example, for ease of explanation, the communication process will be described with reference to the communication between the server device 110 and the client device A.

Step 1: First, the server device 110 searches the client devices connected to the network, using SSDP. In this case, the client device A is detected.

Step 2: Next, the server device 110 requests a device description to the detected client device A, and obtains the device description.

Step 3: The server device 110 requests a service description to the client device A based on the obtained device description, and obtains the service description.

Step 4: Based on the obtained service description, and using a transport protocol, SOAP (Simple Object Access Protocol), the server device 110 transmits a command to the client device A to obtain "GetAuthEncStatus" (i.e., a command to execute the action "GetAuthEncStatus"). In response to this command, the client device A transmits "GetAuthEncStatus", in which the five arguments are set with the wireless connection information of the client device A, to the server device 110. The server device 110 can check a connection status between the client device A and the access point 300, with reference to the arguments of "GetAuthEncStatus" received from the client device A.

That is, the server device 110 can determine whether or not the client device A is securely communicating with the access point 300, with reference to the arguments of "GetAuthEncStatus" received from the client device A. Specifically, by referring to the argument "NewEncModes" of "GetAuthEncStatus", it is possible to determine whether or not the client device A is securely communicating with the access point 300. When the communication is encrypted, the server device 110 can determine that the communication is secure. Alternatively, the server device 110 may determine a type of encryption method with reference to "NewEncModes", and only when a strong encryption method such as AES is used, determine that the communication is secure.

Furthermore, the action "GetAuthEncStatus" is effective to the device having a wireless connection, while the device having only a wired connection does not respond to "GetAuthEncStatus". Thus, according to the fact that the client device A responds to "GetAuthEncStatus", the server device 110 can also determine that the client device A is performing the wireless communication.

As described above, the server device 110 can obtain "GetAuthEncStatus" from the client device A, and at the same time, determine that (1) the client device A is directly connected to the access point 300 using a wireless communication, and (2) the client device A is securely connected with the access point 300.

The server device 110 produces a management table on communication connection statuses of the client devices connected to the network, based on the wireless connection information obtained from the client device A using the above-described process. FIG. 8 shows an example of the management table. The management table manages a type of the interface, encryption capability (enabled/disabled), and a client device identifier, for each of the client devices connected to the network. The client device identifier can be obtained in the step 1. The information on the encryption capability can be determined from "NewEncModes" of "GetAuthEncStatus" obtained in the step 4. The type of the interface can be determined from "GetAuthEncStatus" obtained in the step 4. As for the client device B, since it has not been determined by the above-described process that the client device B is performing the wireless communication, it is possible to determine that the client device B is performing the wired communication. Based on the information on the type of the interface, it is possible to determine whether or not the client device is performing the wireless communication. Moreover, based on the information on the encryption capability, it is possible to determine whether or not the client device is securely connected to the access point. However, since the device having only a wired connection does not have "GetAuthEncStatus" as the service, it is unknown whether or not the encryption is used. That is, by referring to the management table shown in FIG. 8, the server device 110 determines that (1) the client device A is directly connected to the access point 300 using a wireless communication, and (2) the client device A is securely connected to the access point 300.

Figure 9:
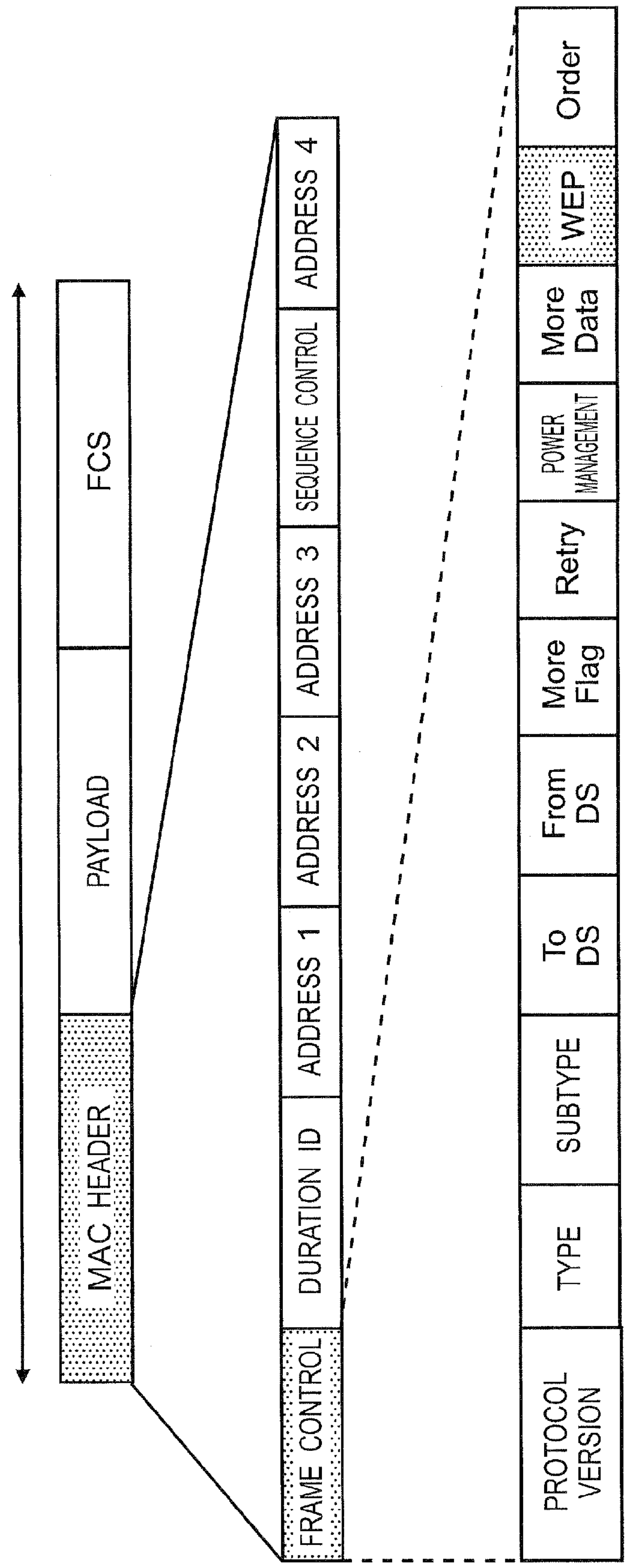
FIG. 9 is a diagram showing a data frame format of a wireless LAN.

In the above example, UPnP is used to obtain the information on the encryption capability for the communication between the client device and the access point, when producing the management table shown in FIG. 8. However, if the client device does not support UPnP, an MAC header of wireless LAN data can be used to obtain the information. As shown in FIG. 9, a data frame of the wireless LAN includes the MAC header, and the MAC header includes a WEP (Wired Equivalent Privacy) field. Thus, by referring to information in the WEP field of the MAC header, it is possible to determine whether or not the encryption is used during the communication. Moreover, in the case of the LAN connection, detailed security information can be set using WPA IE (Wi-Fi Protected Access Information Elements) or the like. FIG. 10 shows another example of the management table produced based on the MAC header of the wireless LAN data. In the management table shown in FIG. 10, MAC addresses of the originating devices are managed as the information for determining whether or not the client device is performing the wireless communication. This MAC addresses can be obtained from communication packets. When the MAC address of the originating device indicates an MAC address of the access point (AP), it is possible to determine that the communication is not wireless.

The above steps 1 to 4 may be carried out when the server device 110 is powered on, and then, periodically carried out at predetermined time intervals. Alternatively, the above steps 1 to 4 may be carried out when newly receiving a connection request from the client device.

1.2.3 Registration Process Flow

Figure 11:
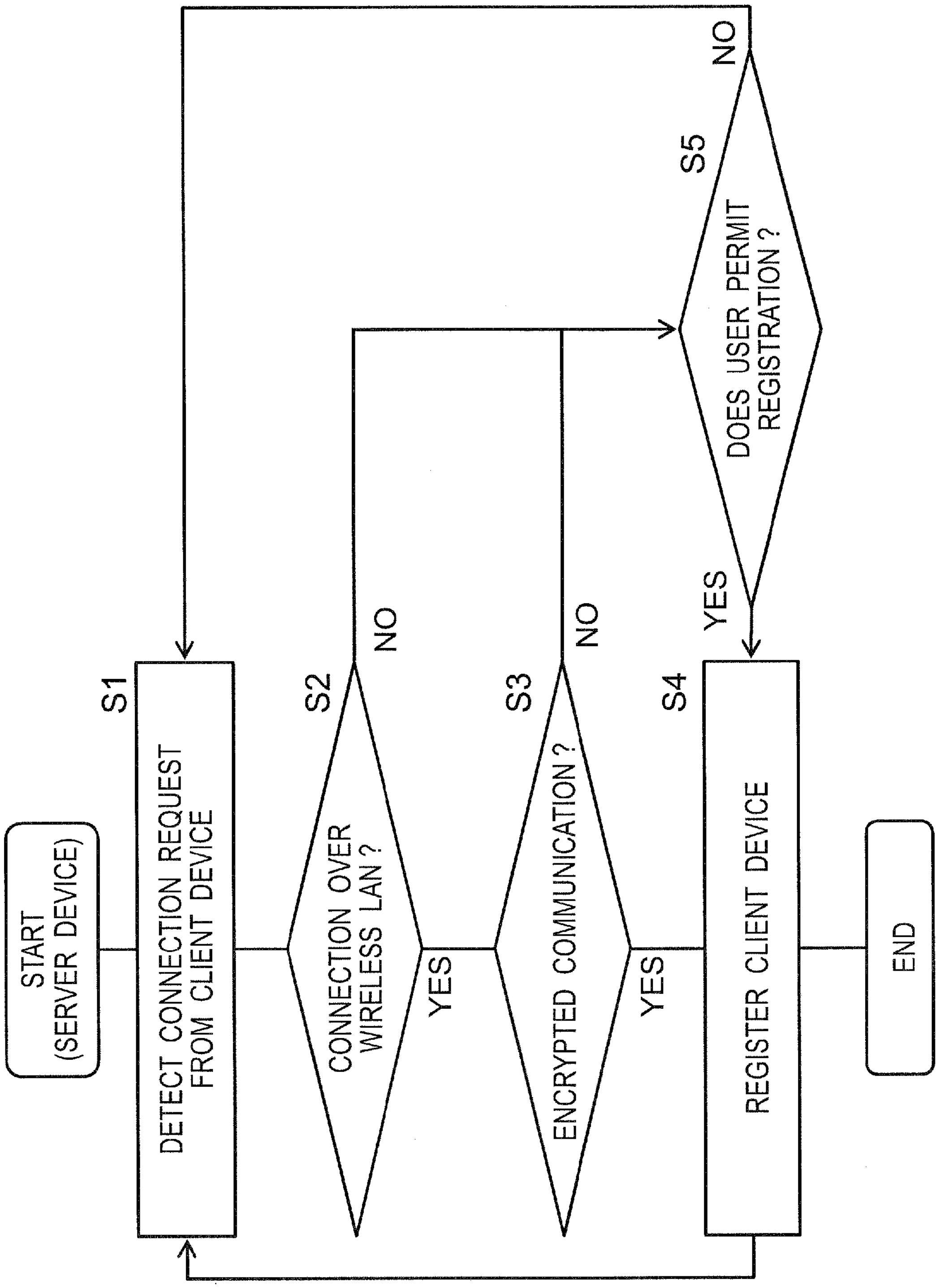
FIG. 11 is a flowchart showing an example of device registration operation for registering the client device with the server device according to Embodiment 1.

With reference to a flowchart shown in FIG. 11, a registration process for registering the client device with the server device according to the present embodiment will be described.

The client detecting unit 113 of the server device 110 detects the client device on the network using SSDP, and obtains its identifier. The client detecting unit 113 detects a connection request from the client device, based on the obtained identifier of the client device (S1).

The client detecting unit 113 obtains GetAuthEncStatus of the client device, from which the connection request is received, using the command defined in UPnP (the command to obtain "GetAuthEncStatus"), and produces the management table as shown in FIG. 8. The wireless connection determining unit 114 determines whether or not the client device is directly connected to the access point using a wireless communication, with reference to the information in the management table (S2).

Furthermore, the security determining unit 115 determines whether or not the client device A is performing the encrypted communication with the access point, with reference to the management table (S3).

If it is determined that the client device is directly connected using a wireless communication, and if it is determined that the client device is performing the encrypted communication with the access point 300, the client determining unit 116 instructs the client registering unit 117 to automatically register the client device with an registered device list. When receiving the instruction from the client determining unit, the client registering unit 117 registers the additional client device with the registered device list, based on the device information of the client device (S4). The registered device list is a list of the client devices permitted to access to the server device, and if a client device is registered with the registered device list, the client device can play the content of the server device.

On the other hand, if it is determined that the client device is not directly connected using a wireless communication, or if it is determined that the client device is not performing the encrypted communication with the access point 300, the client determining unit 116 inquires of a user (administrator) of the server device 110, whether or not to register the client device from which the connection request is received (S5).

Specifically, the client determining unit 116 generates and sends screen data for displaying a message, "Is client device A to be registered?", together with "Yes"/"No" buttons, on a display screen of the server device 110 or a display device connected thereto. If the user (administrator) of the server device 110 selects to register the client device A (i.e., the "Yes" button is pressed), the client determining unit 116 instructs to register the client device with the registered device list, based on the device information of the client device. On the other hand, the user (administrator) of the server device 110 selects not to register the client device A, the client determining unit 116 does not instruct to register the client device with the registered device list as described above. According to this configuration, the user can also selectively register the client device which is not automatically registered.

Moreover, in the step S2 or S3, if it is determined that the client device is not directly connected using a wireless communication, or if it is determined that the client device is not performing the encrypted communication with the access point 300, the server device 110 (the determining unit 116) may transmit a command to the access point 300 or the client device A, to set the encrypted communication for the wireless communication between the client device A and the access point 300. In this case, the access point 300 or the client device A has a function of automatically setting an encryption method when receiving this command. According to this configuration, even if security is not assured, it is possible to automatically set the encrypted communication between the client and access point, thus assuring security and improving usability.

Alternatively, in the step S2 or S3, if it is determined that the client device is not directly connected using a wireless communication, or if it is determined that the client device is not performing the encrypted communication with the access point 300, the client determining unit 116 may display a warning message, "insecure communication is being performed", or a message prompting the user to set the security configurations, on the display screen of the server device 110, the client device, or the display device connected thereto.

1.3 Summary

The server device 110 according to the present embodiment is a server device for transmitting and receiving the data to and from the client device A over the wireless communication network including the access point 300. The server device 110 is provided with: the wireless connection determining unit 114 that determines whether or not the client device is wirelessly communicatively connected over the wireless communication network; the security determining unit 115 for determining whether or not the client device is securely connected to the access point; and the client determining unit 116 for permits the automatic connection (access) of the client device to the server device if the wireless connection determining unit 114 determines that the client device is wirelessly communicatively connected, and if the security determining unit 115 determines that the client device is securely connected to the access point.

As described above, for a secure wireless connection, the present embodiment notice particularly the security status between the client device and the access point, and permits the connection (access) of the client device to the server device only for a secure wireless communication connection between the client device and the access point. With this configuration, a more secure communication between the server device and the client device is achieved. Moreover, the present embodiment determines whether or not the client device is securely connected to the access point, and when the security between the client device and the access point has been confirmed, automatically connects the client device to the server device, thus improving usability.

2. Embodiment 2

According to Embodiment 1, the server device inquires the wireless connection information (GetAuthEncStatus) of the client device. On the other hand, in Embodiment 2, an example is described in which the client device sets its own security information to the server device. A configuration of the wireless communication network system of Embodiment 2 is similar to that of Embodiment 1. Moreover, functions other than ones mentioned below are similar to those explained in Embodiment 1.

2.1 Description of Server Device

In order to enable the client device to set the security information to the server device, the server device 110 according to the present embodiment has the service description in which an action for setting the security information of the client device is defined.

Figure 12:
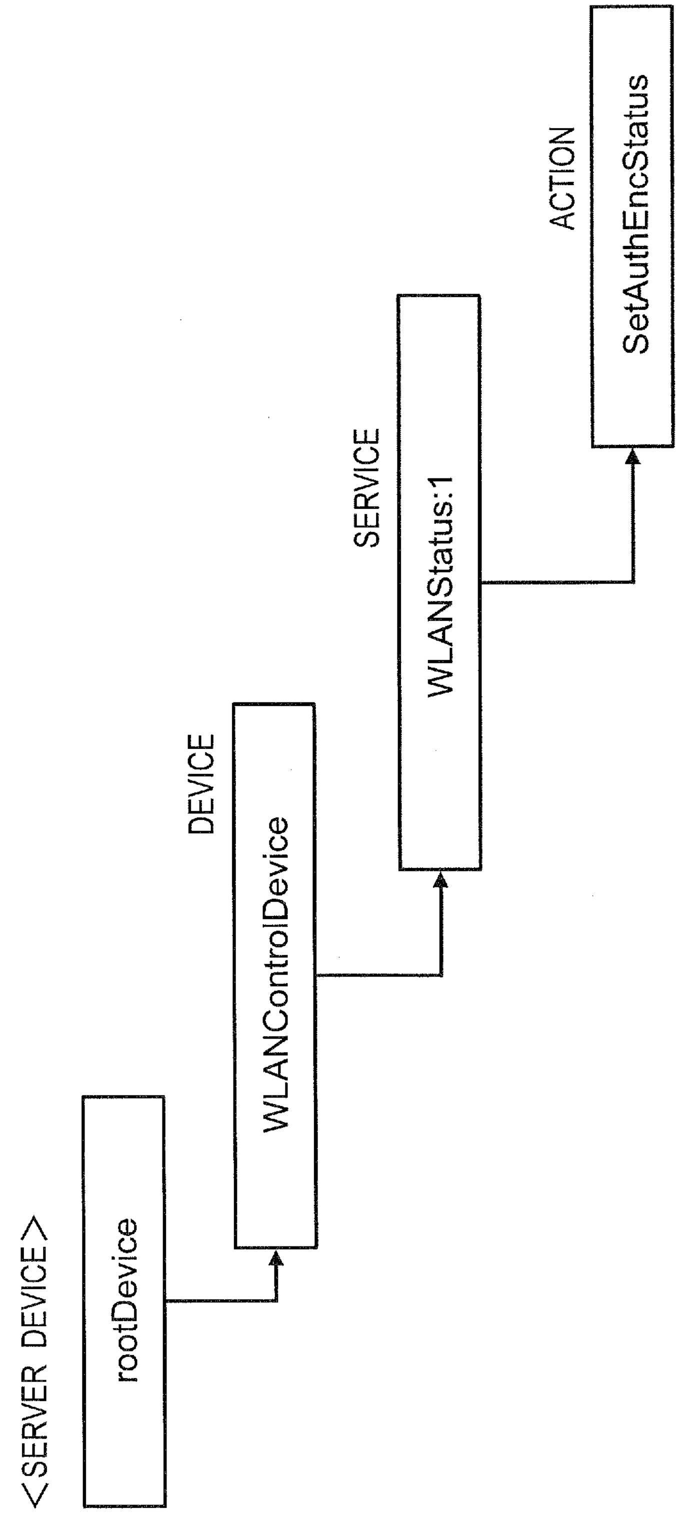
FIG. 12 is a diagram showing an example of UPnP architecture-based descriptions of the server device according to Embodiment 2.

FIG. 12 is a diagram showing a configuration example of the descriptions of the server device 110. The server device 110 has the wireless LAN communication function, and accordingly, has "WLANControlDevice". This device description is a device description newly added in the present embodiment. "WLANControlDevice" has a service, "WLANStatus:1". "WLANStatus:1" has an action, "SetAuthEncStatus". "WLANStatus:1" (wireless information setting service), which is newly added in the present embodiment, is a service having the action "SetAuthEncStatus". Alternatively, a conventional device description "MediaServer: 1" may be provided in place of "WLANControlDevice" newly added, and "WLANStatus: 1" may depend on "MediaServer: 1".

FIG. 13 is a diagram showing an example of the device description of the server device 110. FIG. 14 is a diagram showing an example of the service description of the server device 110. In the example of FIG. 14, "SetAuthEncStatus" (sign "d20") is defined as the action in the service description. This action "SetAuthEncStatus" has "NewMAC", "NewSSID", "NewBSSID", and "NEWEncModes", and "NewAuthModes" as arguments. The meanings of the respective arguments are as described before. Moreover, <direction> of the respective arguments is set to in (sign "d21"). This means that when the action "SetAuthEncStatus" is executed, the respective arguments' values are set to a target of the executed action. That is, when the action "SetAuthEncStatus", in which the wireless connection information of the client device is set to the respective arguments, is executed for the service device 110, the server device 110 is set with the wireless connection information of the client device set in the respective arguments. In this manner, the client device can set the security information to the server device using "SetAuthEncStatus".

2.2 Operation 2.2.1 Connection Between Devices and Content Playback

Figure 15:
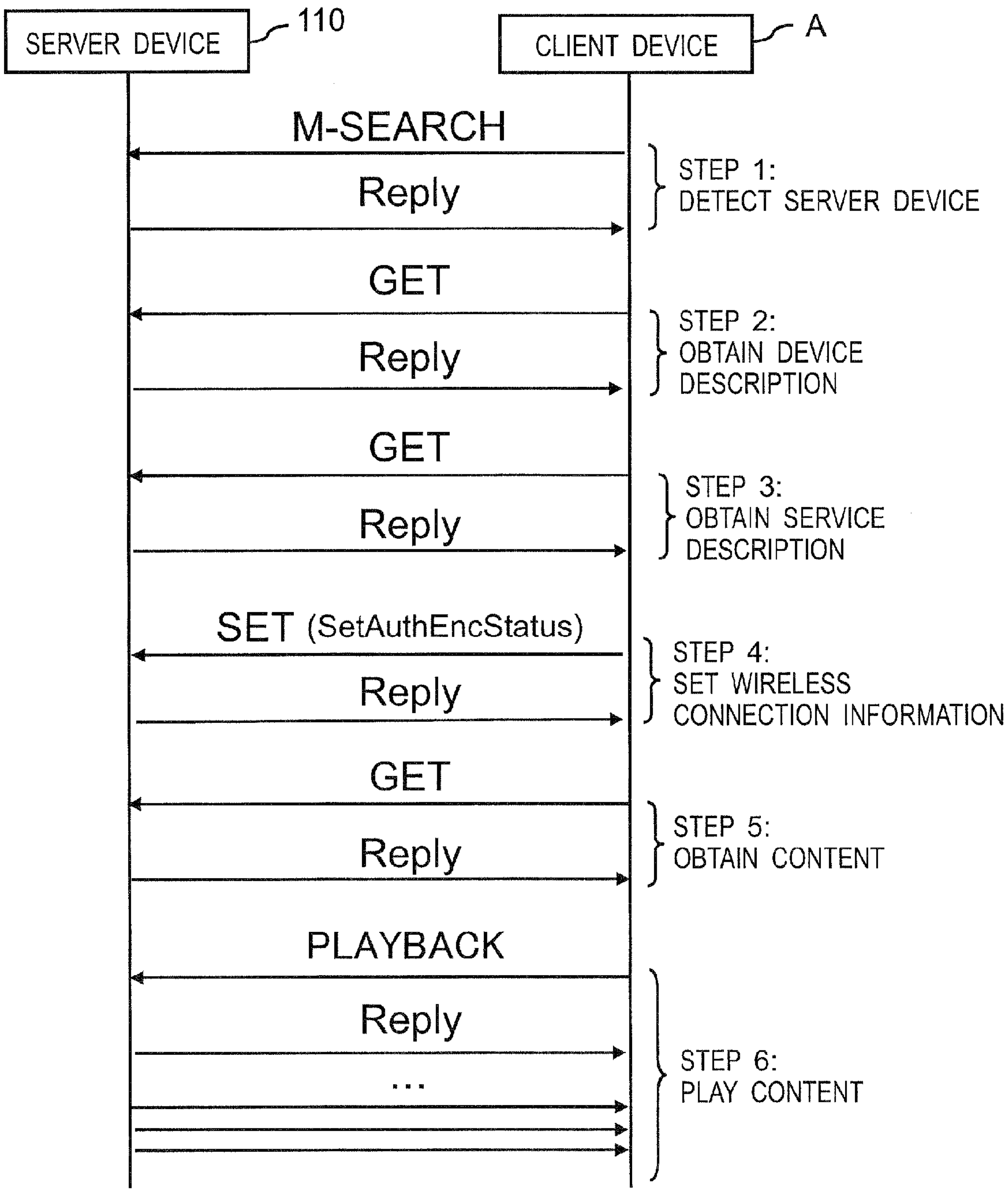
FIG. 15 is a diagram showing a communication process between the server device and the client device of Embodiment 2.

FIG. 15 is a diagram explaining processes for connecting between the client device A and the server device 110 according to the present embodiment and for content playback.

Step 1: The client device A detects the server device connected to the network, using SSDP. In the present example, the client device A detects the server device 110 based on a response from the server device 110.

Step 2: The client device A requests the device description to the detected server device 110, and obtains the same.

Step 3: The client device A requests the service description to the server device 110 based on the obtained device description, and obtains the service description.

Step 4: Based on the obtained service description, and using a transport protocol, SOAP, the client device A transmits a command to the server device 110 to execute "SetAuthEncStatus". Upon receiving the command, the server device 110 obtains the wireless connection information set in the respective arguments of "SetAuthEncStatus".

The server device 110 determines whether or not the client device A is securely communicating with the access point 300, based on the obtained wireless connection information of the client device A. That is, the server device 110 can determine whether or not the client device A is securely communicating with the access point 300, by referring to "NewEncModes".

Furthermore, according to the fact that the client device A supports "SetAuthEncStatus", the server device 110 can determine that the client device A is performing the wireless communication.

When the client device A is performing the wireless communication, and when it is determined that the client device A is securely communicating with access point 300, the server device 110 permits to transmit the content to the client device A. On the other hand, when the client device A is performing the wireless communication, and when it is determined that the client device A is not performing the secure communication, the server device 110 does not permit to transmit the content to the client device A. Hereinafter, it is assumed that when the client device A is performing the wireless communication, the client device A is performing the secure communication.

Step 5: The client device A requests the content to the server device 110, and obtains the same.

Step 6: Then, the client device A plays the content obtained from the server device 110.

2.2.2 Operation of Client Device

Figure 16:
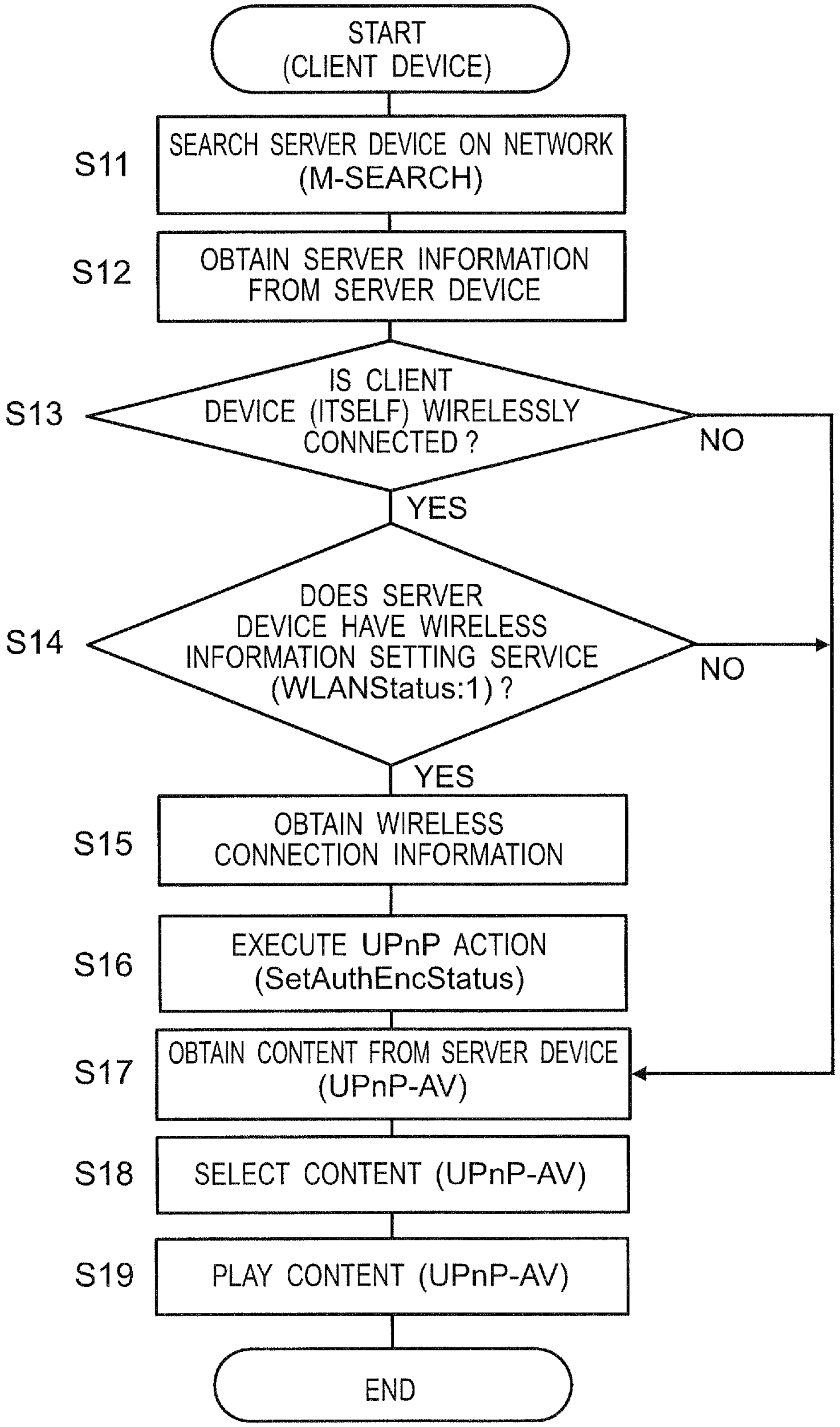
FIG. 16 is a flowchart showing an example of operation of the client device according to Embodiment 2.

FIG. 16 is a flowchart indicating an operation of the client device A according to the present embodiment.

The server detecting unit 213 of the client device A multicasts M-SEARCH to search the server on the network (S11). When the server device on the network is detected as a result of the search, the server detecting unit 213 obtains the information of the detected server device (the device description and the service description) (S12). In this case, it is assumed that the server device 110 is detected.

Next, the client device A determines whether or not the client device A itself is wirelessly connected to the access point 300 (S13).

If the client device A is wirelessly connected to the access point 300, the server communication unit 214 refers to the device description of the server device obtained from the server device 110, and determines whether or not the server device 110 has the wireless information setting service (WLANStatus:1) (S14).

If the server device 110 has the wireless information setting service (WLANStatus:1), the server communication unit 214 obtains the wireless connection information of the client device A, i.e., the information on the MAC address, SSID, the encryption method, and the authentication method, from the connection interface managing unit 216 and the security managing unit 215 (S15).

The server communication unit 214 transmits a command to the server device 110 to execute "SetAuthEncStatus" in which the obtained wireless connection information is set to the respective arguments (S16). The server device 110 obtains the wireless connection information of the client device A by executing the action "SetAuthEncStatus", and determines whether or not the client device A is securely communicating with the access point 300, based the obtained wireless connection information. If it is determined that the client device A is securely communicating with the access point 300, the server device 110 permits the client device A to play the content. In this case, since the client device A is securely communicating with the access point 300, the server device 110 permits the client device A to play the content.

Then, when the server device 110 permits the client device A to play the content, a content list, which is a list of the contents stored in the server device 110, is transmitted to the client device A. The content playing unit 217 receives the content list (S17), displays the content list on the display screen, and waits for selection of a content by the user. When the content is selected by the user, the content playing unit 217 requests the selected content data to the server device 110, based on UPnP-AV (S18). Then, the content playing unit 217 obtains the content data from the server device 110 based on UPnP-AV, and plays the same (S19).

If the client device A is not wirelessly connected (NO at S13), or if the detected server device 110 does not have the wireless information setting service (WLANStatus: 1) (NO at S14), then the action "SetAuthEncStatus" (S15 to S16) is not executed. In this case, the server device 110 may confirm the security of the client device A using a predetermined method, and determine whether or not the content playback is permitted.

2.2.3 Operation of Server Device

Figure 17:
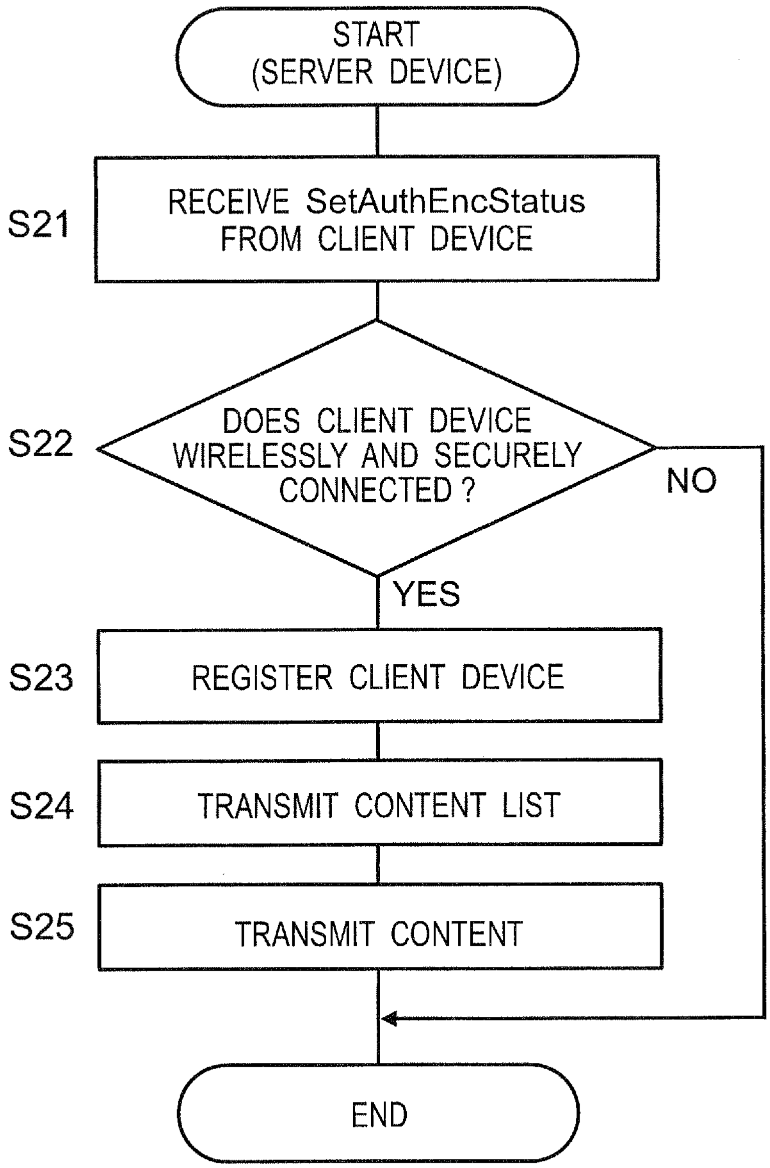
FIG. 17 is a flowchart showing an example of operation of the server device according to Embodiment 2.

FIG. 17 is a flowchart showing an operation of the server device 110 according to the present embodiment. The wireless communication processing unit 112 of the server device 110 receives the command from the client device A to execute the action "SetAuthEncStatus" (S21). The client detecting unit 113 obtains the wireless connection information set in the arguments of "SetAuthEncStatus", and produces the management table. Based on the information of the management table, the wireless connection determining unit 114 and the security determining unit 115 check the wireless connection and the secure connection, respectively. Based on the result of the check, the client determining unit 116 determines whether or not the client device A is wirelessly and securely connected to (communicates with) the access point 300 (S22). If the client device A is wirelessly and securely connected to the access point 300, the client determining unit 116 instructs the client registering unit 117 to register the client device A in order to permit the client device A to play the content.

When receiving the instruction from the client determining unit 116, the client registering unit 117 registers the client device A with the registered device list (S23). As a result of this registration of the device, the client device A can play (access to) the contents stored in the server device 110. The content playback by the client device A may be permitted without registering the client device A.

Then, in accordance with a request from the client device A, the content managing unit 118 transmits the content list, which is a list of the contents held by the server device 110, to the client device A (S24). Then, in accordance with the request from the client device A, the content managing unit 118 transmits the content selected by the client device A (S25).

If the client device A is not wirelessly connected, or if the secure connection is not being performed (NO at S22), the server device 110 does not register the client device A nor transmit the content.

2.3 Conclusion

As described above, according to the present embodiment, the client device can set the wireless connection information of the client device to the server device, and the server device can determine the status of the security between the client and the access point in accordance with the wireless connection information. The configuration according to the present embodiment can also provide a similar effect to that of Embodiment 1.

According to the present embodiment, any content is not permitted to be played when the client device is not securely connected. However, the content having no particular problem in protection of personal information and copyright may be permitted to be played. For example, the content recorded by an individual may be permitted to be played even if not being securely connected.

3. Other Embodiments

Possible variations of the configurations explained in Embodiments 1 and 2 are as follows.

Although FIG. 1 shows the configuration in which the server device and the access point are wirelessly connected, the server device and the access point may be connected by wire. That is, the idea of the foregoing embodiments can be applied to the configuration in which the access point and the client device are wirelessly connected.

The descriptions of UPnP, the number of the arguments, and types of the arguments, and the like disclosed in Embodiments 1 and 2 are examples, and not limited thereto.

Embodiments 1 and 2 determine whether or not the client device and the access point are securely connected, based on the information on the encryption method (NewEncModes), the method for checking the secure connection is not limited thereto. For example, the secure connection may be checked by referring to the information on the encryption method and the information on the authentication method (NewAuthModes). For example, if the encrypted communication is performed, and if the predetermined authentication method is employed, it may be determined that a secure connection is established. Alternately, it may be determined whether or not a secure connection is established, based on only the information on the authentication method.

According to the present disclosure, it is possible to automatically and securely establish a wireless connection between a server device and a client device with a simple process. Therefore, the present disclosure can be applied to a technique for connection between devices remote from each other.

The invention claimed is:

1. A server device for transmitting and receiving data to and from a client device through an access point, the server device comprising:

- a first determining unit configured to determine whether or not the client device is wirelessly connected to the access point, based on reception of a signal from the client device, the signal having an argument indicating an encryption method used in a communication between the client device and the access point;
- a second determining unit configured to determine whether or not the client device is securely connected to the access point, based on the argument of the signal; and
- a third determining unit configured to determine whether or not to allow a connection from the client device to the server device through the access point, based on results of determination of the first and second determining units.

2. The server device according to claim 1, wherein, when the first determining unit determines that the client device is wirelessly connected to the access point, and the second determining unit determines that the client device is securely connected to the access point, the third determining unit permits an automatic connection of the client device to the server device through the access point.

3. The server device according to claim 2, further comprising a registering unit configured to register the client device as an accessible device when the third determining unit permits the automatic connection.

4. The server device according to claim 2, wherein when permitting the automatic connection, the third determining unit permits the client device to play a content stored in the server device.

5. The server device according to claim 3, wherein when the first determining unit determines that the client device is not wirelessly connected to the access point, or when the second determining unit determines that the client device is not securely connected to the access point, the third determining unit displays a screen for asking a user whether or not the client device is to be registered with the registering unit.

6. The server device according to claim 1, wherein when the first determining unit determines that the client device is not wirelessly connected to the access point, or when the second determining unit determines that the client device is not securely connected to the access point, the third determining unit displays a warning message on a display screen.

7. The server device according to claim 1, further comprising a unit configured to transmit, to at least one of the access point and the client device, a command to instruct setting of an encrypted communication between the access point and the client device, when the first determining unit determines that the client device is not wirelessly connected to the access point, or when the second determining unit determines that the client device is not securely connected to the access point.

8. The server device according to claim 1, further comprising a client detecting unit configured to detect the client device in accordance with a UPnP architecture, wherein the first determining unit and the second determining unit perform processes of the determination for the client device detected by the client detecting unit, respectively.

9. A method for connecting a server device to a client device through an access point, the method including:

a first determining step for determining whether or not the client device is wirelessly connected to the access point, based on reception of a signal from the client device, the signal having an argument indicating an encryption method used in a communication between the client device and the access point;

a second determining step for determining whether or not the client device is securely connected to the access point, based on the argument of the signal; and a third determining step for determining whether or not to allow a connection from the client device to the server device through the access point, based on results of determination of the first and second determining steps.

10. The method according to claim 9, wherein, when the first determining step determines that the client device is wirelessly connected to the access point, and the second determining step determines that the client device is securely connected to the access point, the third determining step includes permitting an automatic connection of the client device to the server device through the access point.

11. The method according to claim 10, further including registering the client device as an accessible device when the third determining step permits the automatic connection.

12. The method according to claim 11, wherein the third determining step includes displaying a screen for asking a user whether or not the client device is to be registered, when the first determining step determines that the client device is not wirelessly connected to the access point, or when the second determining step determines that the client device is not securely connected to the access point.

13. The method according to claim 10, wherein the third determining step includes permitting the client device to play a content stored in the server device, when permitting the automatic connection.

14. The method according to claim 9, wherein the third determining step including displaying a warning message on a display screen, when the first determining step determines that the client device is not wirelessly connected to the access point, or when the second determining step determines that the client device is not securely connected to the access point.

15. The method according to claim 9, further including transmitting, to at least one of the access point and the client device, a command to instruct setting of an encrypted communication between the access point and the client device, when the first determining step determines that the client device is not wirelessly connected to the access point, or when the second determining step determines that the client device is not securely connected to the access point.

16. The method according to claim 9, further including detecting the client device in accordance with a UPnP architecture, wherein the first determining step and the second determining step are performed for the detected client device, respectively.

* * * * *